US009425479B2

United States Patent
Kim

(10) Patent No.: US 9,425,479 B2
(45) Date of Patent: Aug. 23, 2016

(54) BATTERY MODULE HAVING IMPROVED STRUCTURE FOR FIXING END PLATE AND METHOD OF FIXING THE SAME

(75) Inventor: Tae-Yong Kim, Yongin-si (KR)

(73) Assignees: Samsung SDI Co., Ltd, Yongin-si (KR); Robert Bosch GmbH, Stuttgart (DE)

( * ) Notice: Subject to any disclaimer, the term of this patent is extended or adjusted under 35 U.S.C. 154(b) by 179 days.

(21) Appl. No.: 12/835,556

(22) Filed: Jul. 13, 2010

(65) Prior Publication Data

US 2011/0151312 A1 Jun. 23, 2011

(30) Foreign Application Priority Data

Dec. 23, 2009 (KR) ........................ 10-2009-0130022

(51) Int. Cl.
*H01M 10/04* (2006.01)
*H01M 6/46* (2006.01)
*H01M 10/052* (2010.01)

(52) U.S. Cl.
CPC ........... *H01M 10/0413* (2013.01); *H01M 6/46* (2013.01); *H01M 10/0481* (2013.01); *H01M 10/052* (2013.01); *Y02T 10/7011* (2013.01); *Y10T 29/49108* (2015.01)

(58) Field of Classification Search
CPC .................... H01M 10/0413; H01M 10/0481; H01M 10/052; H01M 6/46; Y10T 10/7011; Y10T 29/49108
USPC ........ 429/122, 129, 149, 156, 163, 178, 185
See application file for complete search history.

(56) References Cited

U.S. PATENT DOCUMENTS

| 2,171,195 | A | * | 8/1939 | Sonesson | 29/428 |
| 4,020,244 | A | * | 4/1977 | Selinko | 429/100 |
| 5,879,831 | A | * | 3/1999 | Ovshinsky et al. | 429/54 |
| 6,096,452 | A | * | 8/2000 | Gilabert et al. | 429/151 |
| 2006/0093890 | A1 | * | 5/2006 | Steinbroner | H01M 8/248 429/430 |
| 2008/0075971 | A1 | * | 3/2008 | Sun | C22C 38/002 428/659 |
| 2009/0011275 | A1 | | 1/2009 | Nishimura et al. | |
| 2010/0247997 | A1 | * | 9/2010 | Hostler | H01M 2/1077 429/120 |
| 2011/0064992 | A1 | | 3/2011 | Kim et al. | |

FOREIGN PATENT DOCUMENTS

| CN | 1758473 A | 4/2006 | |
| EP | 1 760 806 A2 | 3/2007 | |
| EP | 1760806 | * 3/2007 | .............. H01M 2/10 |

(Continued)

OTHER PUBLICATIONS

223 Physics Lab Linear thermal Expansion, Jan. 27, 2006; Clemson University {http://www.clemson.edu/ces/phoenix/labs/223/expansion/index.html}.*

(Continued)

*Primary Examiner* — Patrick Ryan
*Assistant Examiner* — Aaron Greso
(74) *Attorney, Agent, or Firm* — Lewis Roca Rothgerber Christie LLP

(57) ABSTRACT

A battery module includes a battery unit having a plurality of batteries; a pair of end plates, one of the end plates installed at either end of the battery unit; and a fixing band that encircles the end plates and the battery unit, wherein the fixing band is made from a material that expands when heated and contracts when cooled.

13 Claims, 8 Drawing Sheets

(56) References Cited

FOREIGN PATENT DOCUMENTS

| | | | | |
|---|---|---|---|---|
| JP | H01-104753 | * | 4/1989 | ............... C23C 2/06 |
| JP | H01-205083 | * | 8/1989 | ............... C25D 5/48 |
| JP | 04-118843 U | | 10/1992 | |
| JP | H05-008088 | * | 1/1993 | ............ B23K 37/04 |
| JP | 07-315057 | | 12/1995 | |
| JP | 08-255600 | | 10/1996 | |
| JP | 2000-030612 | | 1/2000 | |
| JP | 2000-311717 | | 11/2000 | |
| JP | 2002-343324 | | 11/2002 | |
| JP | 2003-323874 | | 11/2003 | |
| JP | 2004-227788 | | 8/2004 | |
| JP | 2007-073509 | | 3/2007 | |
| KP | 10-2002-0008291 | | 1/2002 | |
| KR | 2001-0003229 | | 1/2001 | |
| KR | 10-0330607 | | 3/2002 | |
| KR | 10-2007-0025738 | | 3/2007 | |

OTHER PUBLICATIONS

Merriam-Webster (end as synonym for edge, definition 2 {http://www.merriam-webster.com/thesaurus/edge}) printed Sep. 9, 2014.*
ENGLISH Translation: JP 2003-323874 Dec. 21, 2012.*
ENGLISH Translation: JP 2004-227788 Dec. 21, 2012.*
ENGLISH Translation: H07-315057 Dec. 21, 2012.*
ENGLISH Translation: 2002-343324 Dec. 21, 2012.*
JP Office Action Oct. 30, 2012.*
EP Search Rpt Dec. 29, 2010.*
Translation: JP H08-255600 Feb. 7, 2011.*
European Search Report dated Dec. 29, 2010, for corresponding European Patent application 10191130.3, noting listed references in this IDS.
English abstract and English machine translation for Japanese Publication 08-255600 listed above, 12 pages.
KIPO Office action dated May 25, 2011, for Korean priority Patent application 10-2009-0130022, noting listed references in this IDS, 4 pages.
Patent Abstracts of Japan, and English machine translation of Japanese Publication 2000-030612, listed above, 17 pages.
EP Office action dated Mar. 5, 2013, for European Patent Application No. 10191130.3, (7 pages).
Japanese Office action dated Oct. 30, 2012, for corresponding Japanese Patent application 2010-177457, (2 pages).
Patent Abstracts of Japan, and English machine translation of Japanese Publication 07-315057 listed above, (24 pages).
Patent Abstracts of Japan, and English machine translation of Japanese Publication 2002-343324 listed above, (25 pages).
Patent Abstracts of Japan, and English machine translation of Japanese Publication 2003-323874 listed above, (11 pages).
Patent Abstracts of Japan, and English machine translation of Japanese Publication 2004-227788 listed above, (18 pages).
SIPO Office action dated Mar. 26, 2014, with English translation, corresponding to Chinese Patent application 201010538808.7, (15 pages).
English machine translation of Chinese Patent Publication CN1758473 dated Apr. 12, 2006, listed above, (3 pages).
EPO Office action dated Mar. 12, 2015, for corresponding European Patent application 10191130.3, (6 pages).

* cited by examiner

BATTERY MODULE HAVING IMPROVED STRUCTURE FOR FIXING END PLATE AND METHOD OF FIXING THE SAME

CROSS-REFERENCE TO RELATED APPLICATION

This application claims the benefit of Korean Patent Application No. 10-2009-0130022, filed on Dec. 23, 2009, in the Korean Intellectual Property Office, the disclosure of which is incorporated herein in its entirety by reference.

BACKGROUND

1. Field

One or more embodiments of the present invention relate to a battery module having a plurality of batteries connected to each other.

2. Description of the Related Art

A battery module is an element of a high-capacity power supply unit formed of a plurality of batteries connected to each other and may be used as a power source for, for example, electric vehicles.

The batteries forming such a battery module are often lithium ion batteries. In a lithium ion battery, the performance thereof does not often deteriorate even if charging and discharging is repeatedly performed. However, a negative electrode of the battery may expand while lithium ions are transferred during charging. Since the battery module is formed of a plurality of lithium ion batteries connected to each other in series or in parallel, if each lithium ion battery expands a little, the entire battery module may be expanded by about 5% to about 10%. As such, the form or shape of the battery module may be excessively modified or distorted so that attaching and separating of the battery module to and from its original position may be difficult, causing electric resistance of the batteries to increase. Moreover, if the battery module is used in electric vehicles, about eight battery modules are stacked to form a battery pack to be installed in the electric vehicles. Thus, if the form of each battery module is modified, the degree of modification over the entire battery module assembly is great and thus serious problems may occur.

Accordingly, in the battery module, end plates are placed at both ends of secondary battery lines in order to suppress expansion of the secondary batteries and bar type connection rods are connected to the end plates placed at both ends of secondary battery lines, thereby fixing the end plates.

However, in general, since the connection rods and the end plates are connected to each other by using a number of bolts and nuts, it takes a relatively long time to connect them and the bolts and nuts protrude from of the battery module, thereby increasing the volume of the battery module.

An increase in the volume of the battery module causes an overall volume increase in devices employing the battery module and thus limits design of the devices. In particular, if the battery module is employed in electric vehicles, an installation space is limited and thus, if the volume of the battery module is reduced, more design flexibility is permitted.

SUMMARY

One or more embodiments of the present invention include a battery module having an improved structure for fixing end plates without using bolts and nuts.

According to one or more embodiments of the present invention, a battery module includes a battery unit having a plurality of batteries; a pair of end plates, one of the end plates installed at either end of the battery unit; and a fixing band that encircles the end plates and the battery unit, wherein the fixing band is made from a material that expands when heated and contracts when cooled.

In one embodiment, the fixing band includes a fastener for connecting ends of the fixing band together to form a closed-loop. For example, the fastener may be a weld. In alternate embodiments, the fastener may include male threaded parts being threaded in opposite directions and a turnbuckle combined with the male threaded parts, wherein the fastener is between ends of the fixing band; a tongue and a groove that fit to each other and a pin that is inserted through openings in the tongue and groove, wherein the fastener is between ends of the fixing band; or a clip at each end of the fixing band, wherein the clips are slidingly engaged.

In one embodiment, an outwardly facing surface of the end plates is formed in an arc form protruding away from the battery unit and the end plate has an accommodation groove in which the fixing band is accommodated. Further, the fixing band may be made of a material such that a length of the fixing band can be lengthened by heating and can be shortened by cooling, for example, an aluminum-coated steel sheet or a galvanized steel sheet.

Also provided is a method of assembling a battery module including a plurality of batteries and a pair of end plates, one of the end plates installed at either end of the battery unit, the method including thermally extending a length of a fixing band so that the length of the fixing band is longer than a circumference of an assembly of the battery unit and the end plates; installing the fixing band around the assembly; and cooling the fixing band to shorten the length of the fixing band such that the fixing band contacts each of the end plates.

In one embodiment, the fixing band is thermally expanded by high-frequency heating and is cooled by natural cooling or forced ventilation cooling. Additionally, the ends of the fixing band may be attached together using any one of the fasteners described or by any other suitable fastener.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1A:
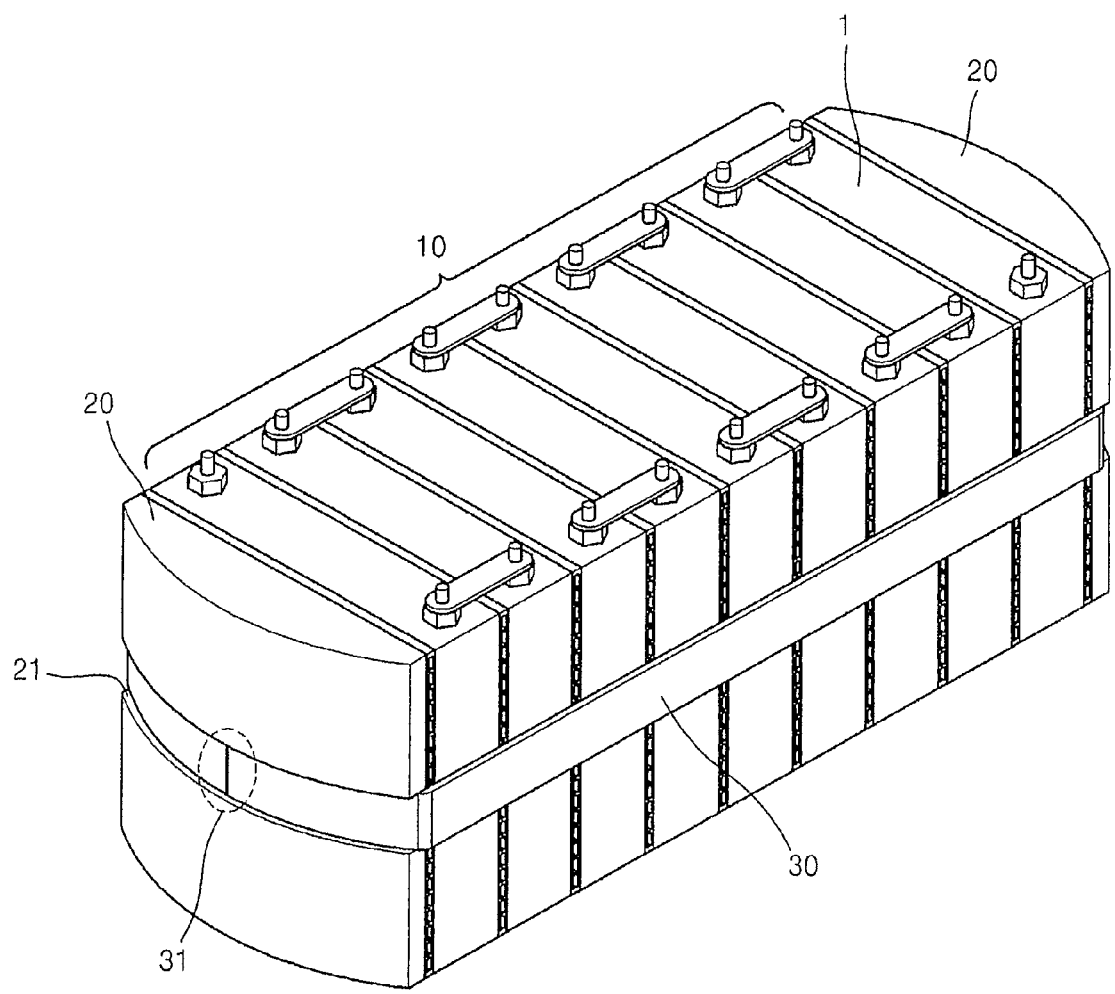
FIG. 1A is a diagram of a battery module according to an embodiment of the present invention.
Figure 1B:
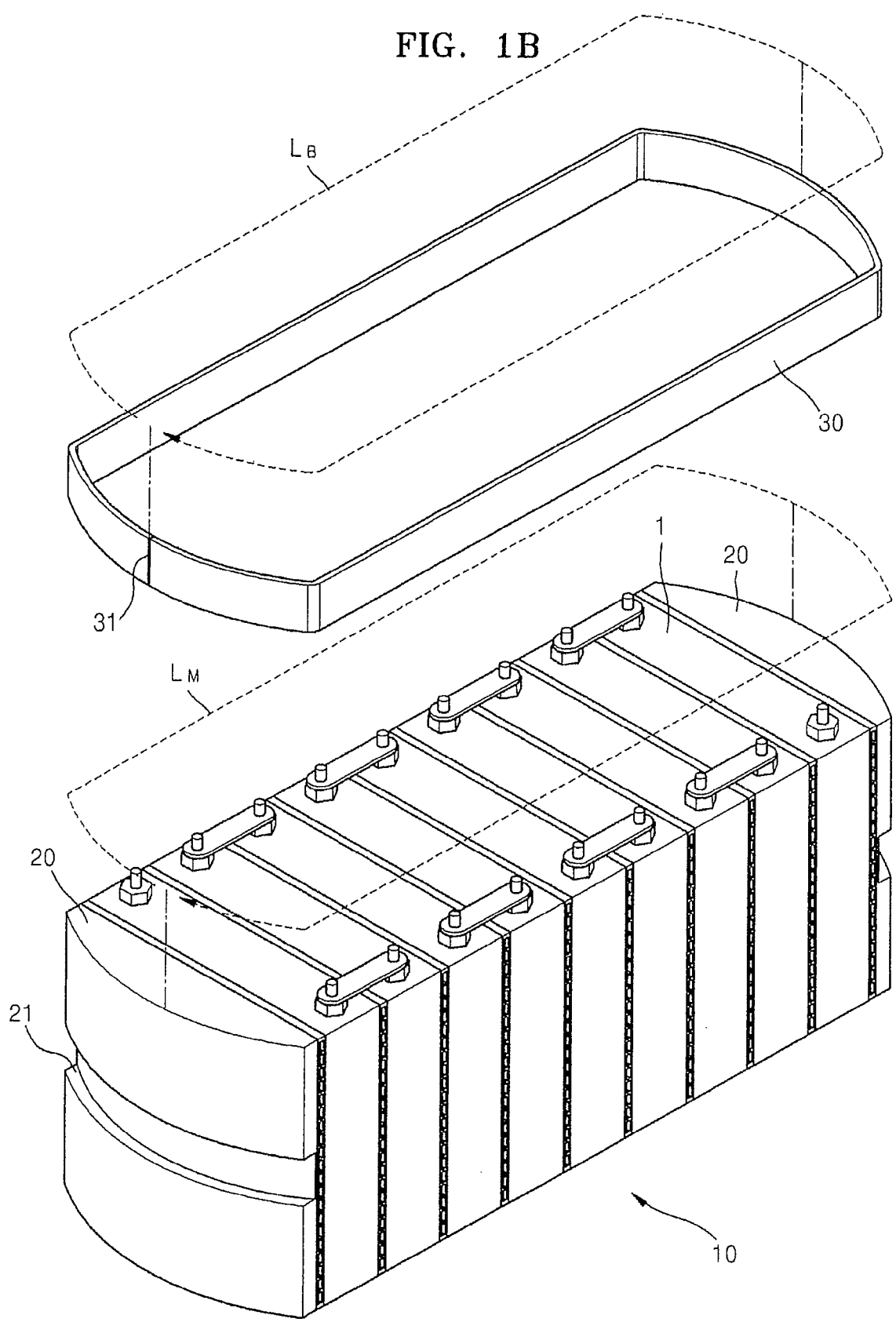
FIG. 1B is a diagram of a fixing band of the battery module of FIG. 1A.

FIGS. 1A and 1B illustrate a battery module according to an embodiment of the present invention. As illustrated in FIG. 1A, the battery module according to the present embodiment includes a battery unit 10 and a pair of end plates 20, wherein the battery unit 10 includes a plurality of batteries 1 connected to each other in line and one of the pair of end plates 20 is installed at either end of the battery unit 10. A fixing band 30 surrounds and tightly binds an assembly of the pair of end plates 20 and the battery unit 10 and thus opposes the expansion of the battery unit 10. That is, if the battery unit 10 expands, a force pushing the pair of end plates 20 to the outside (i.e., away from each other) is exerted. Here, the fixing band 30 secures the pair of end plates 20 so they are not significantly moved away from each other, and thus a significant modification or distortion of the battery module is suppressed.

The fixing band 30 is formed of a material that expands while heated at high frequencies and contracts while cooled down. Examples of the material may include an aluminum-coated steel sheet or a galvanized steel sheet used in an explosion protection band of a Braun tube. The material may be a composition containing iron (Fe) as a base, carbon (C) of about 0.005 wt % or below, nitrogen (N) of about 0.005 wt % or below, silicon (Si) of about 0.1 to 0.5 wt %, phosphorus (P) of about 0.1 wt % or below, sulfur (S) of about 0.02 wt % or below, manganese (Mn) of about 1.05 to about 2.0 wt %, and aluminum (Al) of about 1.0 wt % or below. The length $L_B$ (refer to FIG. 1B) of the fixing band 30 at room temperature is equal to or shorter than the total circumference $L_M$ (refer to FIG. 1B) of the assembly of the battery unit 10 and the end plates 20; however, the length of the fixing band $L_B$ is lengthened by an amount $L_{expansion}$ over the total circumference $L_M$ of the assembly of the battery unit 10 and the end plates 20 by heating. That is, $L_B + L_{expansion} \geq L_M > L_B$ and the fixing band 30 is manufactured to satisfy such a condition.

A combining unit 31 or fastener connects both ends of the fixing band 30. In the present embodiment, the combining unit 31 is a weld formed by welding. That is, ends of the fixing band 30 are attached together by welding without using a separate connection member so as to form a closed-loop form. The welding may be butt welding or lap welding. However, the welding method is not limited as long as the weld is sufficient to ensure that the ends do not separate due to the expansion of the battery unit 10.

The end plates 20 are formed in an arc form having a convex center so that an angle of a bend that occurs while the fixing band 30 winds around the end plates 20 is eased and thus the fixing band 30 is less likely to be damaged. An accommodation groove 21 is the groove for accommodating the fixing band 30 and holds the installation position of the fixing band 30.

Fixing of the assembly of the battery unit 10 and the end plates 20 by using the fixing band 30 may be performed as follows.

First, the fixing band 30, which may be expanded by heating and contracted by cooling, is prepared. The fixing band 30 is manufactured to satisfy the condition, $L_B + L_{expansion} \geq L_M > L_B$, and both ends of the fixing band 30 are bound by welding, thereby forming a closed-loop.

The fixing band 30 is heated at high frequencies and expands causing the length thereof to be longer than the circumference of the assembly of the battery unit 10 and the end plates 20, that is, $L_B \rightarrow L_B + L_{expansion}$.

The expanded fixing band 30 is fixed in the accommodation groove 21 and is installed around the assembly of the battery unit 10 and the end plates 20.

Then, the fixing band 30 is cooled and contracted so that the length thereof returns to substantially its original length, that is, $L_B + L_{expansion} \rightarrow L_B$. Since the original length $L_B$ of the fixing band 30 is equal to or shorter than the circumference $L_M$ of the assembly of the battery unit 10 and the end plates 20, a strong clamping force is exerted. Accordingly, if the battery unit 10 expands, the fixing band 30 firmly supports the pair of end plates 20 so that there is no gap therebetween. The fixing band 30 may be cooled by natural cooling by remaining at room temperature or may be cooled by forced ventilation.

Accordingly, if the battery unit 10 and the end plates 20 are fixed using the fixing band 30 which may expand and contract, the connection unit minimally protrudes from the fixing band compared to if bolts and nuts are use and also eliminates bolts from having to be connected by nuts. Thus, an assembling process is convenient and a structure is simple.

Figure 2A:
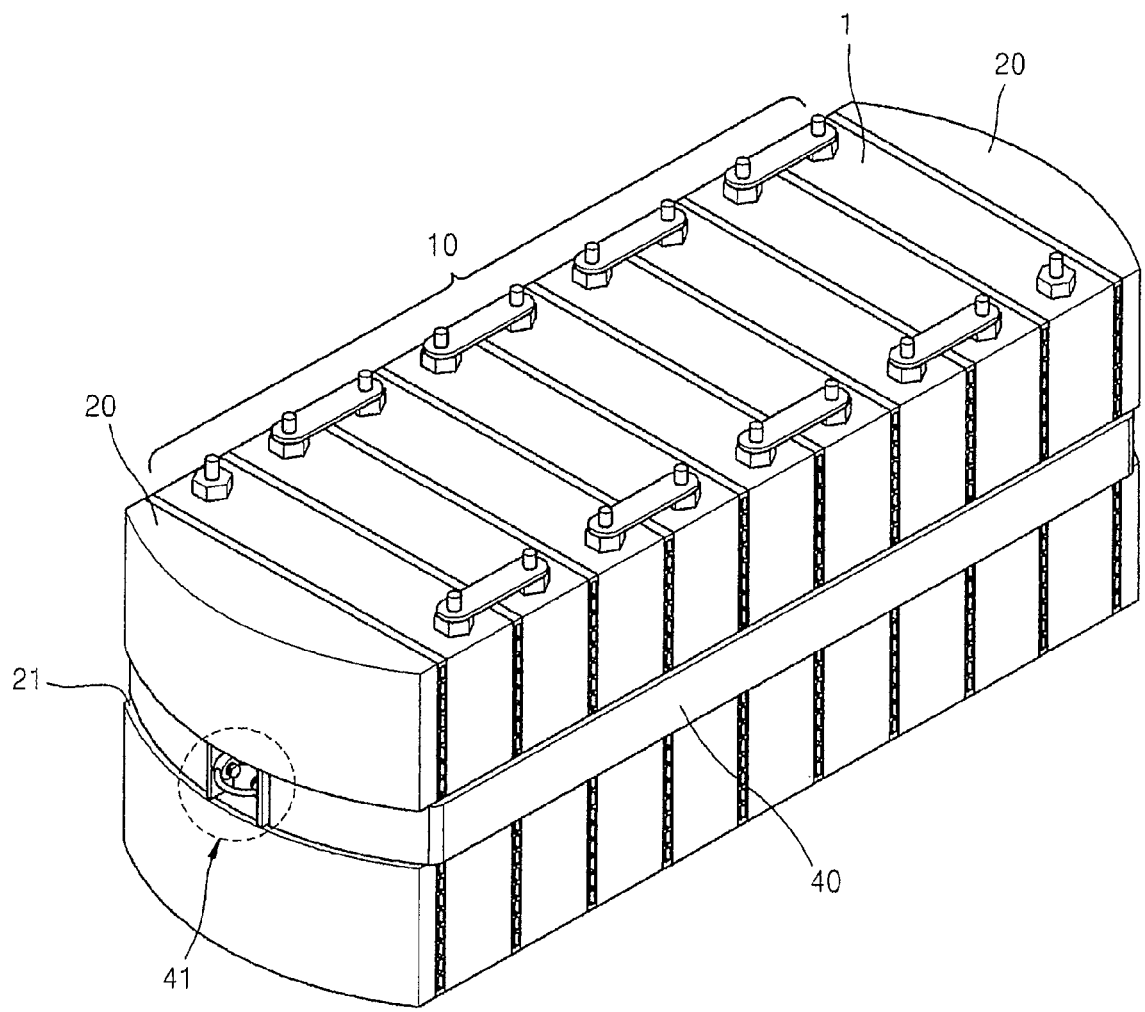
FIG. 2A is a diagram of a battery module according to another embodiment of the present invention.
Figure 2B:
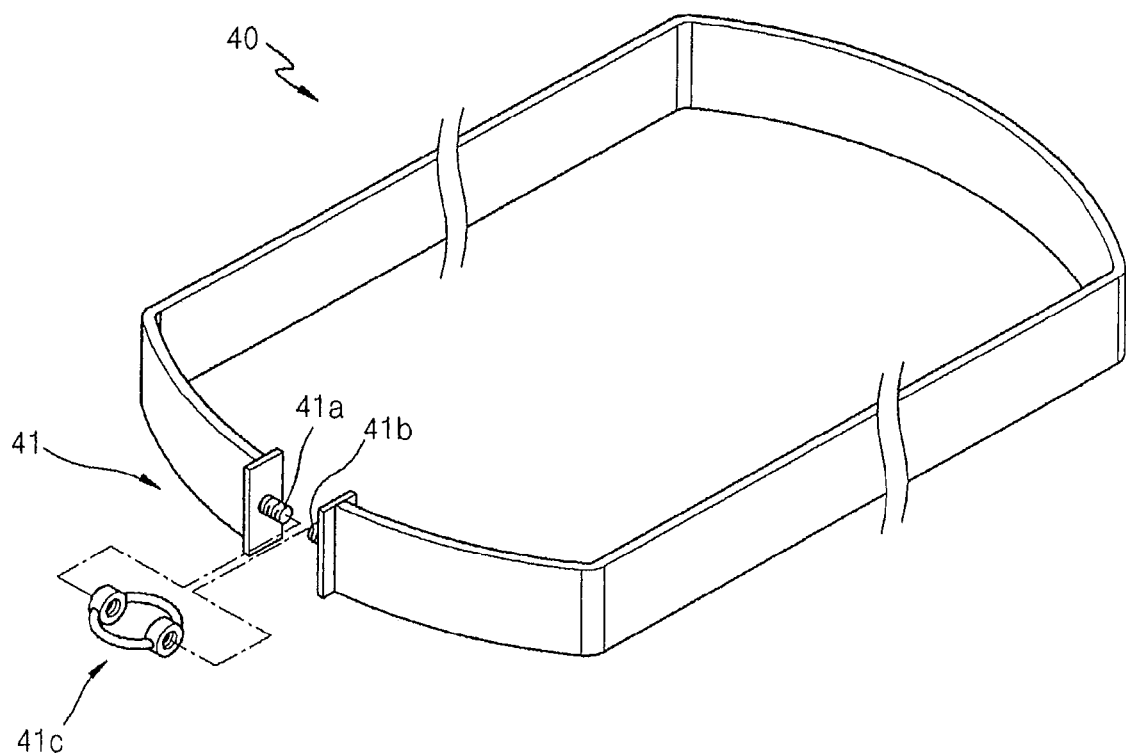
FIG. 2B is a diagram of a fixing band of the battery module of FIG. 2A.

FIGS. 2A and 2B illustrate a battery module according to another embodiment of the present invention.

As illustrated in FIG. 2A, the battery module according to the present embodiment includes the battery unit 10 including the plurality of batteries 1 connected to each other in line, the pair of end plates 20, one end plate installed at either end of the battery unit 10, and a fixing band 40 that surrounds and tightly binds an assembly of the pair of end plates 20 and the battery unit 10.

The fixing band 40 is formed of a material that expands while heated at high frequencies and contracts while cooled down. Examples of the material may include an aluminum-coated steel sheet or a galvanized steel sheet used in an explosion protection band of a Braun tube.

The length $L_B$ of the fixing band 40 is equal to or shorter than the total circumference $L_M$ of the assembly of the battery unit 10 and the end plates 20 at room temperature; however, the length $L_B$ of the fixing band is lengthened over the total circumference $L_M$ of the assembly of the battery unit 10 and the end plates 20 by an amount $L_{expansion}$ added to the length $L_B$ based on the expansion during heating of the fixing band 40. That is, $L_B + L_{expansion} \geq L_M > L_B$ and the fixing band 40 is manufactured to satisfy such a condition.

A combining unit or fastener 41 connects both ends of the fixing band 40. In the present embodiment, the combining unit 41 includes a turnbuckle 41c and threaded screw parts 41a and 41b. Referring to FIG. 2B, the screw parts 41a and 41b are formed at ends of the fixing band 40 and include screws facing each other and threaded in different directions. That is, if the screw part 41a at one side is a right screw (i.e., threaded clockwise), the screw part 41b at the other side is a left screw (i.e., threaded counterclockwise). The turnbuckle 41c includes a female threaded screw portion to fit each of the screw parts 41a and 41b. Accordingly, if the turnbuckle 41c turns in one direction, the screw parts 41a and 41b are simultaneously combined by and coupled to the turnbuckle 41c.

The turnbuckle 41c is located in the accommodation groove 21 prepared in the end plate 20 and thus does not significantly protrude from the assembly.

Fixing of the assembly of the battery unit 10 and the end plates 20 by using the fixing band 40 may be performed as follows.

First, the fixing band 40, which may be expanded by heating and contracted by cooling, is prepared. Ends of the fixing band 40 are combined by the turnbuckle 41c and the screw parts 41a and 41b, thereby forming a closed-loop form. When the fixing band 40 is combined in a closed-loop form, the fixing band 40 is manufactured to satisfy the condition, $L_B + L_{expansion} \geq L_M > L_B$.

The fixing band 40 is heated at high frequencies and expands so that the length thereof is longer than the circumference of the assembly of the battery unit 10 and the end plates 20, that is, $L_B \rightarrow L_B + L_{expansion}$.

The expanded fixing band 40 is fixed in the accommodation groove 21 to fit the turnbuckle 41c and is installed around the assembly of the battery unit 10 and the end plates 20.

Then, the fixing band 40 is cooled and contracted so that the length thereof returns to substantially its original length, that is, $L_B + L_{expansion} \rightarrow L_B$. Since the original length $L_B$ of the fixing band 40 is equal to or shorter than the circumference $L_M$ of the assembly of the battery unit 10 and the end plates 20, a strong clamping force is exerted. Accordingly, if the battery unit 10 is expanded, the fixing band 40 firmly supports the pair of end plates 20 so that there is no gap therebetween.

Figure 3A:
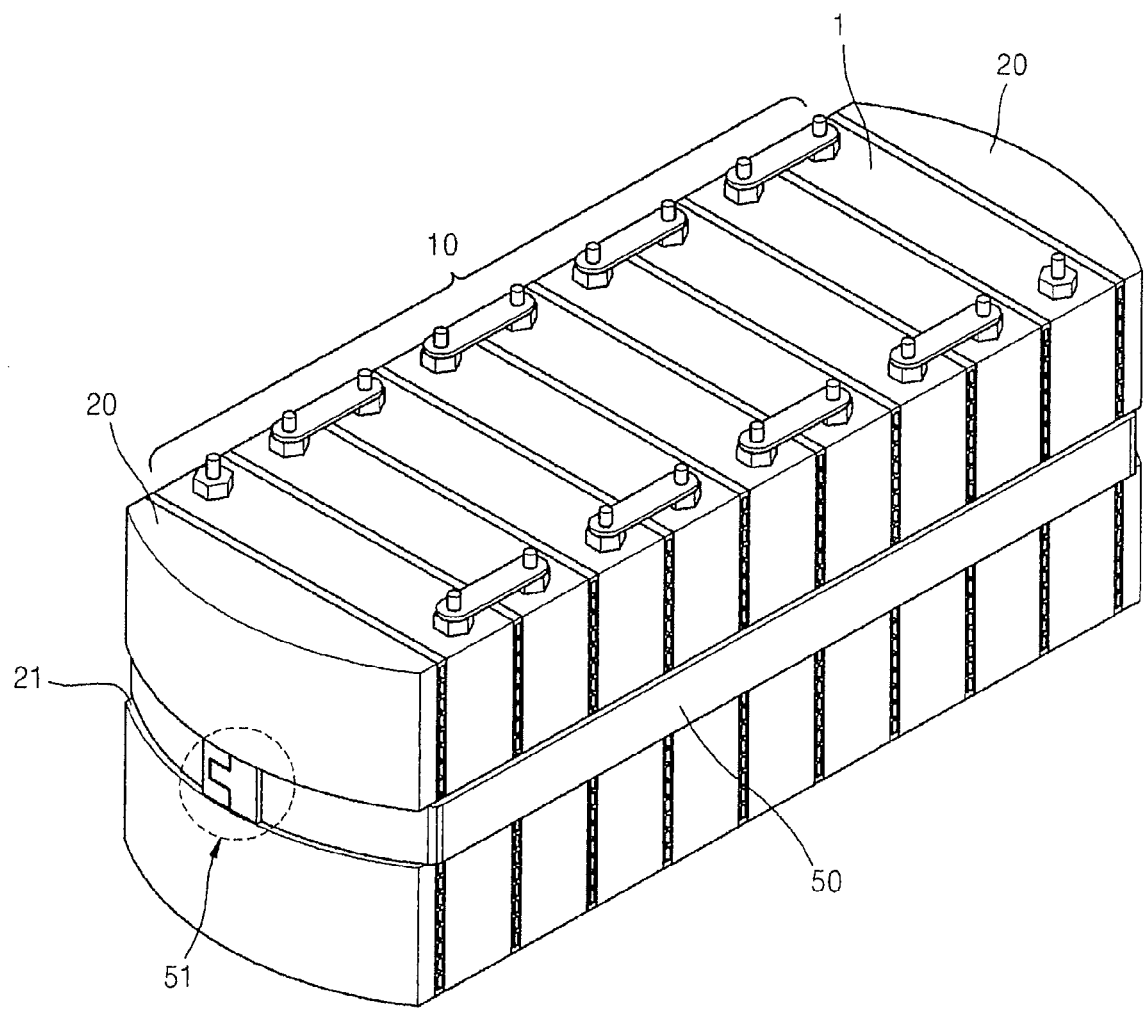
FIG. 3A is a diagram of a battery module according to still another embodiment of the present invention.
Figure 3B:
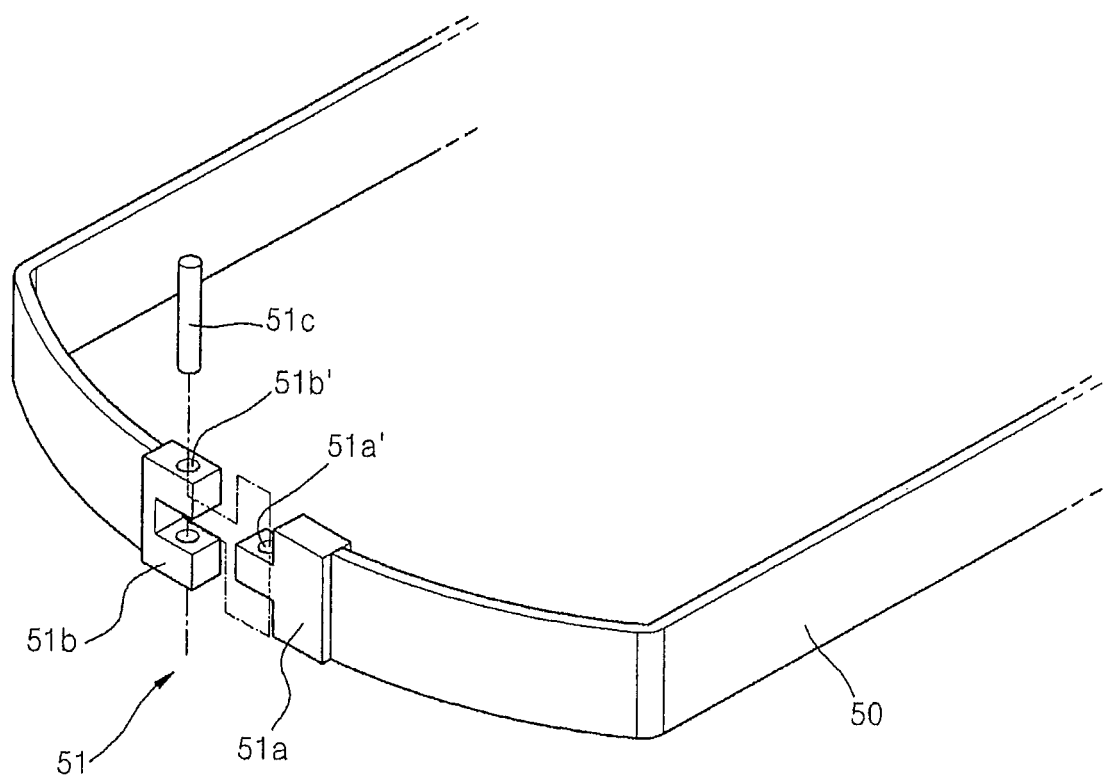
FIG. 3B is a diagram of a fixing band of the battery module of FIG. 3A.

FIGS. 3A and 3B illustrate a battery module according to another embodiment of the present invention.

As illustrated in FIG. 3A, the battery module according to the present embodiment includes the battery unit 10 including the plurality of batteries 1 connected to each other in line, the pair of end plates 20, one end plate installed at either end of the battery unit 10, and a fixing band 50 that surrounds and tightly binds an assembly of the pair of end plates 20 and the battery unit 10.

The fixing band 50 is formed of a material that expands when heated at high frequencies and contracts when cooled down. Examples of the material may include an aluminum-coated steel sheet or a galvanized steel sheet used in an explosion protection band of a Braun tube.

The length $L_B$ of the fixing band 50 is equal to or shorter than the total circumference $L_M$ of the assembly of the battery unit 10 and the end plates 20 at room temperature; however, the length of the fixing band $L_B$ is lengthened to be greater than the total circumference $L_M$ of the assembly of the battery unit 10 and the end plates 20 by the amount $L_{expansion}$ by heating. That is, $L_B + L_{expansion} \geq L_M > L_B$ and the fixing band 50 is manufactured to satisfy such a condition.

A combining unit or fastener 51 connects both ends of the fixing band 50. In the present embodiment, the combining unit 51 includes prominence and depression (i.e., a tongue and a groove) parts 51a and 51b and a combining pin 51c. Referring to FIG. 3B, the tongue and groove parts 51a and 51b, which fit to each other, are formed at ends of the fixing band 50, the tongue 51a being on one end and the groove 51b being on the other end. The tongue and groove parts 51a and 51b respectively include openings 51a' and 51b' penetrating therethrough. Accordingly, the tongue and groove parts 51a and 51b are fit to each other and the combining pin 51c is inserted through the openings 51a' and 51b', thus, fixing both ends of the fixing band 50 together.

Fixing of the assembly of the battery unit 10 and the end plates 20 by using the fixing band 50 may be performed as follows.

First, the fixing band 50, which may be expanded by heating and contracted by cooling, is prepared. Both ends of the fixing band 50 are combined by the tongue and groove parts 51a and 51b and the combining pin 51c, thereby forming a closed-loop. After the fixing band 50 is combined in a closed-loop form, the fixing band 50 is manufactured to satisfy the condition, $L_B + L_{expansion} \geq L_M > L_B$.

The fixing band 50 is heated at high frequencies and expands so that the length thereof is longer than the circumference of the assembly of the battery unit 10 and the end plates 20, that is, $L_B \rightarrow L_B + L_{expansion}$.

The expanded fixing band 50 is fixed in the accommodation groove 21 and is installed around the assembly of the battery unit 10 and the end plates 20.

Then, the fixing band 50 is cooled and contracted so that the length thereof returns to substantially its original length, that is, $L_B + L_{expansion} \rightarrow L_B$. Since the original length $L_B$ of the fixing band 50 is equal to or shorter than the circumference $L_M$ of the assembly of the battery unit 10 and the end plates 20, a strong clamping force is exerted. Accordingly, if the battery unit 10 is expanded, the fixing band 50 firmly supports the pair of end plates 20 so that there is no gap therebetween.

Figure 4A:
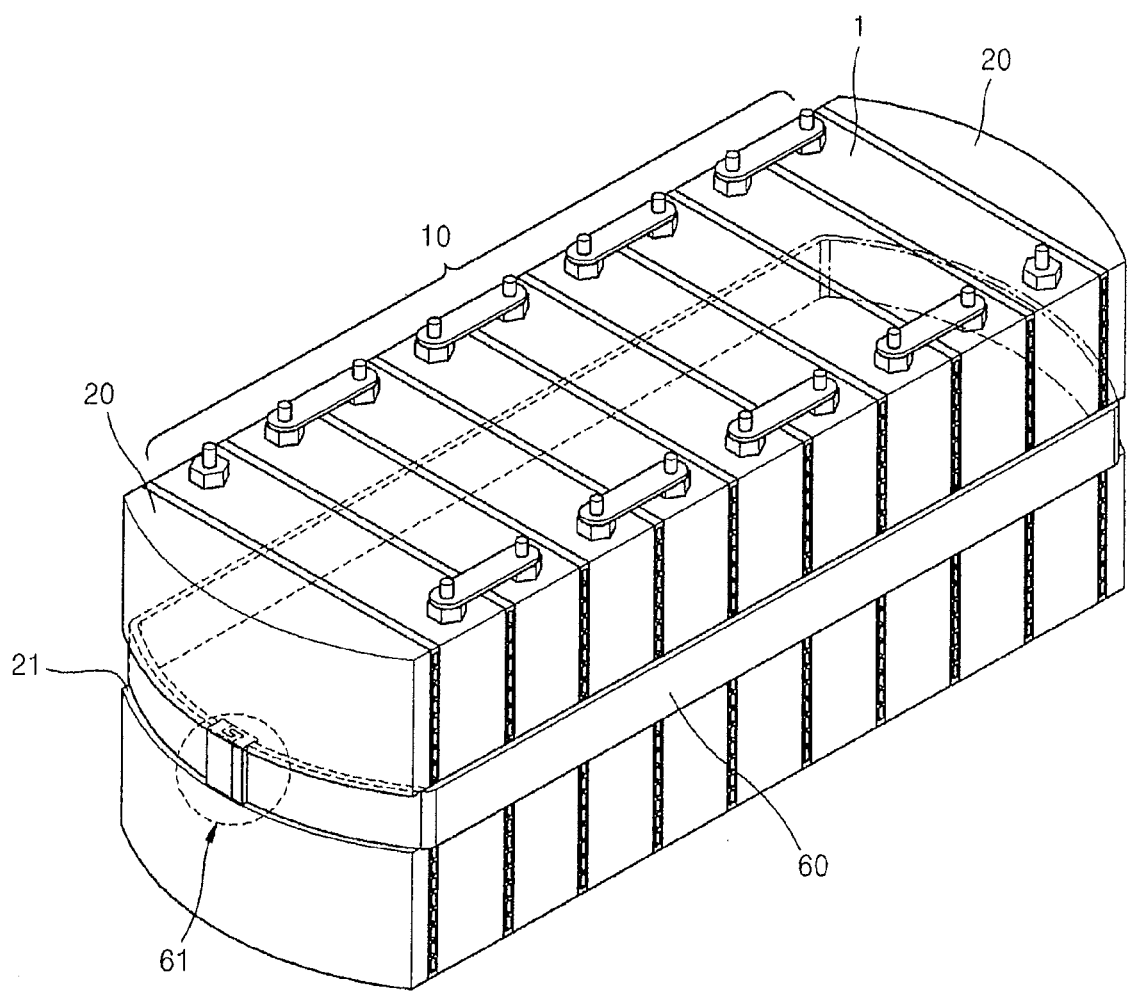
FIG. 4A is a diagram of a battery module according to yet another embodiment of the present invention.
Figure 4B:
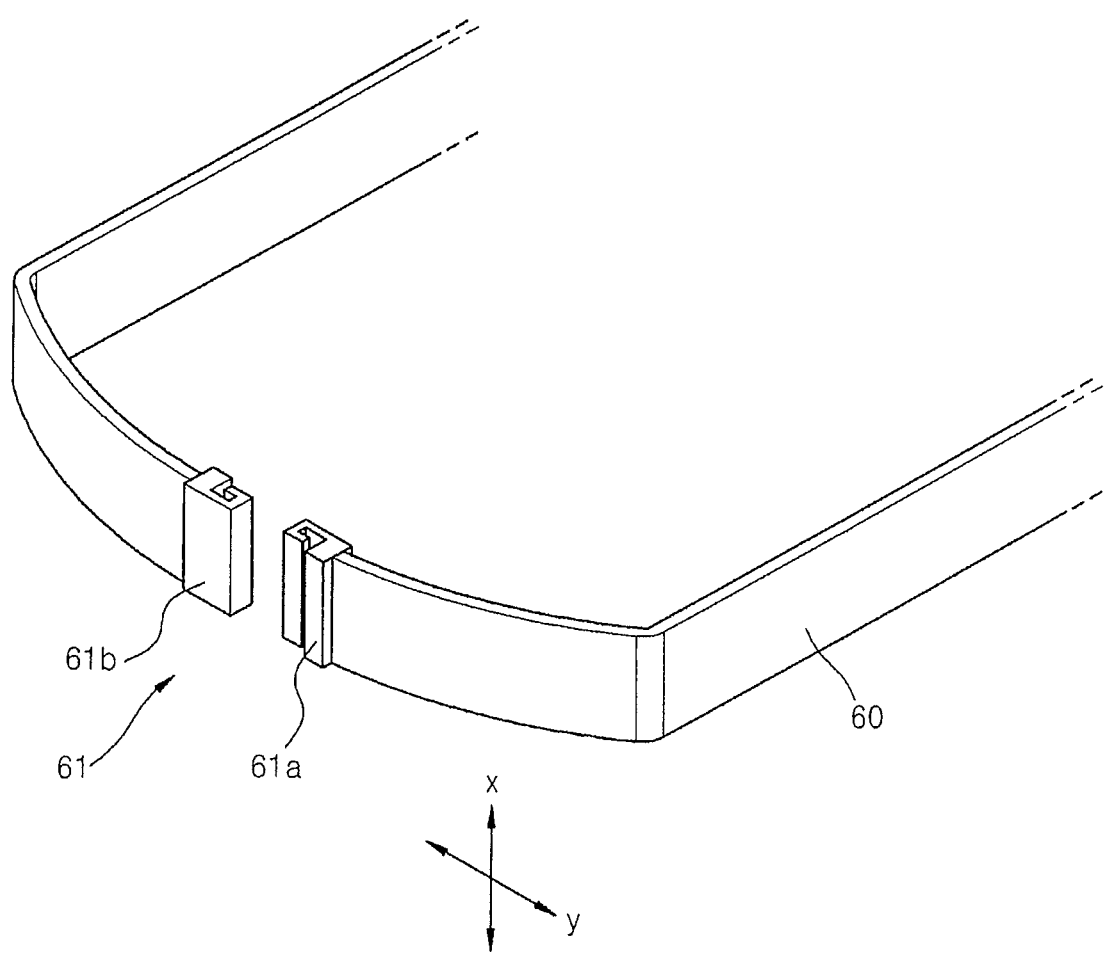
FIG. 4B is a diagram of a fixing band of the battery module of FIG. 4A.

FIGS. 4A and 4B illustrate a battery module according to another embodiment of the present invention.

As illustrated in FIG. 4A, the battery module according to the present embodiment includes the battery unit 10 including the plurality of batteries 1 connected to each other in line, the pair of end plates 20, one end plate installed at either end of the battery unit 10, and a fixing band 60 that surrounds and tightly binds an assembly of the pair of end plates 20 and the battery unit 10.

The fixing band 60 is formed of a material that expands when heated at high frequencies and contracts when cooled down. Examples of the material may include an aluminum-coated steel sheet or a galvanized steel sheet used in an explosion protection band of a Braun tube.

The length $L_B$ of the fixing band 60 is equal to or shorter than the total circumference $L_M$ of the assembly of the battery unit 10 and the end plates 20 at room temperature; however, the length of the fixing band $L_B$ is lengthened to be greater than the total circumference $L_M$ of the assembly of the battery unit 10 and the end plates 20 by the amount $L_{expansion}$ by heating. That is, $L_B + L_{expansion} \geq L_M > L_B$ and the fixing band 60 is manufactured to satisfy such a condition.

A combining unit or fastener 61 connects both ends of the fixing band 60 together. In the present embodiment, the combining unit 61 includes clips 61a and 61b. Referring to FIG. 4B, the clips 61a and 61b slide together to be fastened to each other and are formed at ends of the fixing band 60. Accordingly, if the clips 61a and 61b are combined with each other, the clips 61a and 61b are not separable from each other in a tensile direction (a Y-axis direction, see FIG. 4B) which is substantially perpendicular to a sliding direction (an X-axis direction).

Fixing of the assembly of the battery unit 10 and the end plates 20 by using the fixing band 60 may be performed as follows.

First, the fixing band 60, which may be expanded by heating and contracted by cooling, is prepared. Both ends of the fixing band 60 are combined by the clips 61a and 61b, thereby forming a closed-loop. While the fixing band 60 is combined in a closed-loop form, the fixing band 60 is manufactured to satisfy the condition, $L_B + L_{expansion} \geq L_M > L_B$.

The fixing band 60 is heated at high frequencies and expands so that the length thereof is longer than the circumference of the assembly of the battery unit 10 and the end plates 20, that is, $L_B \rightarrow L_B + L_{expansion}$.

The expanded fixing band 60 is fixed in the accommodation groove 21 and is installed around the assembly of the battery unit 10 and the end plates 20.

Then, the fixing band 60 is cooled and contracted so that the length thereof returns to substantially its original length, that is, $L_B + L_{expansion} \rightarrow L_B$. Since the original length $L_B$ of the fixing band 60 is equal to or shorter than the circumference $L_M$ of the assembly of the battery unit 10 and the end plates 20, a strong clamping force is exerted. Accordingly, if the battery unit 10 is expanded, the fixing band 60 firmly supports the pair of end plates 20 so that there is no gap therebetween.

As described above, according to one or more of the above embodiments of the present invention, the fixing band that is expanded by being heated and is contracted by being cooled in the battery module applies a restoring or biasing force to the end plates in a direction opposite to battery expansion. Thus, assembling of the battery module is simpler than a general battery module to which a number of bolts and nuts are connected. Also, no parts of bolts and nuts protrude outside and thus the volume of the battery module may be reduced.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A battery module comprising:
    a battery unit comprising a plurality of batteries;
    a pair of end plates, one of the end plates installed at either end of the battery unit, wherein each of the end plates has an accommodation groove extending in a first direction and an end face, wherein the end face and the accommodation groove are formed entirely in an arc protruding away from the battery unit; and
    a fixing band oriented in and continuously contacting the accommodation groove in the first direction so as to encircle the end plates and the battery unit, the fixing band having a first end and a second end and being entirely continuous, wherein the first end and the second end abut each other, and wherein the fixing band comprises a material that expands when heated and contracts when cooled.

2. The battery module of claim 1, wherein the fixing band comprises a fastener connecting ends of the fixing band together to form a closed-loop.

3. The battery module of claim 2, wherein the fastener is a weld.

4. The battery module of claim 1, wherein the fixing band comprises a material such that a length of the fixing band can be lengthened by heating so that the length of the fixing band is longer than a circumference of an assembly of the battery unit and the end plates and such that the length of the fixing band can be shortened by cooling such that the fixing band contacts each of the end plates.

5. The battery module of claim 1, wherein the fixing band comprises aluminum-coated steel or galvanized steel.

6. A method of assembling a battery module comprising a plurality of batteries and a pair of end plates, one of the end plates installed at either end of the battery unit, the method comprising:
    thermally extending a length of a fixing band so that the length of the fixing band is longer than a circumference of an assembly of the battery unit and the end plates;
    installing the fixing band around the assembly; and
    cooling the fixing band to shorten the length of the fixing band such that the fixing band contacts each of the end plates.

7. The method of claim 6, wherein the fixing band is thermally expanded by high-frequency heating.

8. The method of claim 6, wherein the fixing band is cooled by natural cooling or forced ventilation cooling.

9. The method of claim 6, further comprising attaching ends of the fixing band together to form a closed loop.

10. The method of claim 9, wherein the ends of the fixing band are attached by welding.

11. The method of claim 9, wherein the ends of the fixing bands include male threaded parts being threaded in opposite directions and a turnbuckle and wherein the ends of the fixing band are attached by threading the turnbuckle onto the male threaded parts.

12. The method of claim 9, wherein a first end of the ends has a tongue with an opening extending therethrough and a second end of the ends has a groove with an opening extending therethrough, wherein the ends are attached by inserting the tongue into the groove portion and inserting a pin into the openings in the tongue and the groove.

13. The method of claim 9, wherein the ends of the fixing band each include a clip and wherein the ends are attached to each other by sliding the clip from a first end of the ends into the clip of a second end of the ends.

* * * * *